United States Patent Office 2,995,803
Patented Aug. 15, 1961

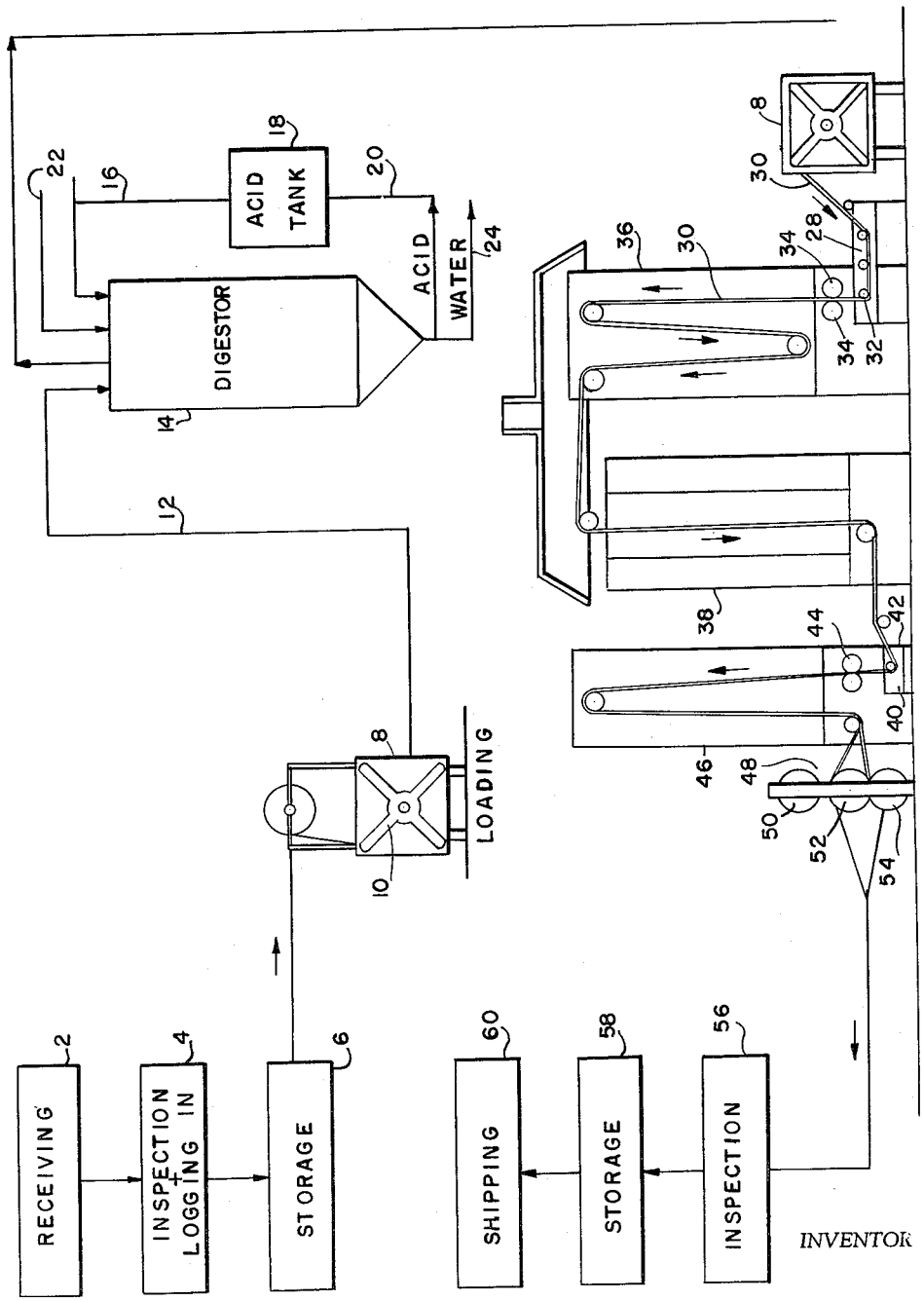

2,995,803
PROCESS OF PREPARING HEAT-RESISTANT GLASS FABRIC
James F. Moore, Wilmington, Del., assignor to Haveg Industries, Inc., Wilmington, Del., a corporation of Delaware
Filed May 21, 1959, Ser. No. 814,850
11 Claims. (Cl. 28—76)

The present invention relates to the preparation of acid etched glass fibers having improved physical properties.

It is an object of the present invention to improve the retention after acid etching of the desirable physical properties of the original glass fabric.

Another object is to provide a glass fabric having superior resistance to high temperatures.

A further object is to provide a glass fabric having high temperature insulating values.

An additional object is to provide an acid etched glass fabric which is dimensionally stable.

Yet another object is to provide an acid etched glass fabric with improved abrasion resistance.

A still further object is to prepare an acid etched glass fabric having a higher total silica content and before firing having a higher sodium carbonate soluble silica.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by treating glass fabrics in the form of tape, yarns, filaments, batts, mats or cloth under certain carefully controlled conditions.

The single figure of the drawing is a flow-sheet illustrating one method of carrying out the invention.

Better retention of the desirable physical properties in the original glass fabric, e.g. cloth, are obtained by using a minimum of handling of the glass cloth in the unlubricated form. There should be a minimum of movement of the cloth in which the fibers have an opportunity to saw each other between the time in which the weaving lubricant is removed in the etching process and the time the final combination finish and lubricant is applied.

It has been found critical to employ hydrochloric acid as the etching acid. For best results, the etching should be done at a temperature of 150° F. or above. Since boiling agitates the etching bath and cloth, the temperature should be below the boiling point, e.g. ½° F. below. By the use of superatmospheric pressure, temperatures as high as 230° F. and higher can be employed. The hydrochloric acid can be of 5 to 30% concentration by weight, preferably being 10–15%.

By the use of shorter acid digestion times than is conventional and such higher temperatures, e.g. 180° F., and, particularly 190° F. and above, there is obtained a product which has more uniformly high retention of the physical properties of the original cloth before etching.

It is also important that the glass cloth be thoroughly and uniformly washed to remove all of the acid. The product is then dried at any temperature up to the operating temperature of the furnace. Air drying and infrared drying can be employed. Preferably the drying is accomplished in the drying oven at moderate to low temperature with convection air drying, warm air drying or infrared drying. The glass cloth then goes into the shrinking furnace maintained at about 1700° to 2350° F., preferably 1800° F. to 2000° F. This heat shrinking is a critical feature of the process and temperature above or below this range does not give satisfactory products. The shrinking is continued until substantially no more shrink is left in the cloth, e.g. less than 2%. After the glass cloth leaves the shrinking oven a mono-molecular layer of a finishing agent is applied. The finishing agent not only serves to produce a better product after addition of the resin binder to form the final laminated product but also acts as a lubricant during the handling of the glass fiber fabric itself and stops self-abrasion thereof prior to its ultimate use.

The finish is normally applied from a solution, e.g. in water, so as to give a solid pick-up of 0.7 to 0.8% or, preferably, less, e.g. 0.5%. After application of the finish the glass cloth is again dried, preferably at low temperature. When the binding resin is to be a phenolic resin, e.g. phenol-formaldehyde or phenol-furfural, or a melamine-aldehyde resin, e.g. melamine formaldehyde or an epoxy resin, e.g. bisphenol A-epichlorhydrin resin, the preferred finishing agent is an amino silane, e.g. A–1100, which is an alkylaminodiethoxysilane manufactured by Union Carbide Corp. In place of the aminosilane, other known finishing agents can be employed, such as methacrylatochromic chloride available commercially as Volan). When the glass cloth is to be bonded with a polyester resin, e.g. styrene modified ethylene glycol maleate, the preferred finishing agents are alkenyl silanes such as vinyltrichlorosilane, diallyldiethoxysilane and vinyl triethoxysilane (available commercially as A–172 by the Union Carbide Corp.).

The glass fibers employed as starting materials have incorporated the protective lubricating size applied to the filaments as they are formed. Typical of such sizes are dextrinized starch, hydrogenated vegetable oil, nonionic emulsifying agents, gelatine and polyvinyl alcohol. It is also possible to heat glass having other finishes present on the fabric, e.g., heat cleaned glass, commonly known as #112 finish, or heat treated glass, known as #111. The lubricating size is removed during the acid treatment and it is for this reason that it is critical to keep handling at a minimum until the finishing agent is applied.

It has been found advantageous to employ the larger diameters of glass fibers. Thus, the best results are obtained with a style 182 satin weave glass cloth, woven with 150s yarns. This yarn is composed of type G glass having a fiber diameter 0.00038 inch. When utilizing a fabric woven from type E glass fiber (fiber diameter of 0.00028 inch) such as a standard style 182 glass cloth, it was not possible to obtain as good results. Since type G fibers are less expensive than the finer type E fibers, this is a process advantage.

It has been found that the composition of the glass in the starting material is very important. Fiber in a woven fabric may contain the following approximate percentages of constituents, by weight. Silica ($SiO_2$), 53%; sodium (as sodium oxide), 0.2 to 0.3% (a trace); calcium (as calcium oxide), 16.8%; alumina (as aluminum oxide) and iron (as iron oxide), combined, 14.8%; boron (as boron oxide), 10.4%; magnesium (as magnesium oxide), 4.4%; potassium (as potassium oxide), 0.2 to 0.3% (a trace). Any small variation in these components may have a great effect on the final quality of the finished material.

It has been found that the sodium carbonate soluble silica after the acid etching should be above 90% and preferably above 95%, e.g. 95 to 99%. The total silica of the product after the heat shrinking should be well above 90% and preferably above 95%, e.g. 95 to 99%.

Among other advantages obtained by the invention is that calcium and magnesium salts are present in the product in only trace amounts.

The invention will be best understood in connection with the drawing wherein glass cloth, e.g. style 182, woven with 150s yarn of 38 inch width, passes from the receiving room 2 to the inspection room 4 and thence to the storage room 6. The glass cloth is then sent to rack 8 where it is wound into a roll with successive layers of the cloth separated by glass rods 10 to allow acid to circulate freely within the bundle. The rack, loaded with the glass cloth, goes via line 12 to digestor 14 containing 14% hydrochloric acid supplied via line 16 from tank 18. The rack is maintained stationary, and the bundle securely fastened to prevent movement. The leaching acid bath was maintained at 180° F. for four hours. (At more elevated temperatures, the digestion time can be reduced to one hour.) At completion of the digestion, the acid is drawn off via line 20 and returned to tank 18 where make-up acid is added. After completion of the acid leaching step, the impurities introduced in the acid by the leaching process can be removed by conventional purification steps prior to returning the acid to the digestor. Wash water is pumped via line 22 into the digestor 14. The water is introduced as a gentle spray and removed via line 24. This procedure prevents undue movement of the cloth. It has been found that the washing is not even if all of the washing is done in the digestor. Therefore, preferably, the rack 8 is removed from the digestor before completion of the washing operation and brought to a special wash tank 28, although the entire washing can be carried out in the digestor. The glass cloth 30 is unwrapped from the rack and passed through wash tank 28 where a gentle spray of water is passed over the cloth and allowed to drain off. By the use of guide rolls 32 to form an appropriate path, the glass cloth is allowed to remain in the wash tank 28 until the pH is constant. This washing removes all of the water soluble salts which may be present within the weave of the cloth. (The use of the rack 8 can be eliminated and the process made continuous by unwinding a roll of glass cloth from storage and passing it continuously through the digestor and then continuously through a separate wash tank. In such a procedure, care must be taken not to have undue movement of the cloth in a manner that the glass fibers will saw each other.)

After leaving the wash tank 32 excess water is removed from the cloth with the aid of a gentle squeezing action provided by rolls 34. The cloth is then dried by the use of hot air in oven 36 at a temperature of 180° F. Infra red or other conventional drying media can be employed in place of the hot air.

Next, the glass cloth is passed to the heat shrinking oven 38 maintained at 2000° F. The oven can be heated by gas or electricity. It comprises a slotted unit which contains the energy sources on the two larger interior walls. The temperature is sufficiently high that most of the energy is transmitted to the cloth as radiation. (The maximum temperature used in the furnace was 2350° F. although 1800–2000° F. is preferred.) A dwell time of eight minutes was sufficient to give optimum shrink, i.e. less than 2% residual shrink in the cloth. (The dwell time may range from one minute to a half hour or more depending on the specific temperatures used and the amount of shrinkage in the product.) Immediately after leaving oven 38 the glass cloth 30 was passed through finish solution 40 in tank 42. The finish employed was the aminosilane designated as A–1100 and identified more fully supra. The quantity of finish picked up is determined by the concentration of the finish in the solvent, e.g. water in the case of A–1100 and by the pressure of the squeeze rolls 44 which serve to pull the cloth through the bath. The concentration of the finish in the water was adjusted so that pick-up on the dried cloth was 0.5% by weight. This pick-up imparts the softest texture to the fibers and, when subsequently impregnated by resin, gives the best physical properties. In place of the aminosilane A–1100, there can be employed other finishing agents such as those previously mentioned, for example. The cloth is then dried by passing through hot air drying tower 46 maintained at 150–200° F. This temperature is most efficient for continuous operation, but other temperatures can be employed from room temperature to 300° F. (It is also possible to evaporate some of the water by the use of infra-red heaters before going through the dryer 46, although the finished quality of the glass cloth is not as good.) The cloth is then interleaved on roll 52 with polyethylene film 48 from roll 50 and wound on rewind roll 54. The interleaving with polyethylene or other thin film material such as polypropylene paper, regenerated cellulose and saran (a vinylidene chloride resin) further aids in preventing the glass fibers from cutting each other. Then the glass cloth goes to the inspection room 56, storage room 58, and, finally, is shipped at 60.

In the specific example described in connection with the drawing, the glass cloth which was 38 inches wide shrank to approximately 36.5 inches after the acid digestion and shrank further to about 33 inches after the heating at 2000° F. The residual shrinkage on repeated application of heat did not change these dimensions appreciably. A chemical analysis of the finished material had a silica content of over 95%. The bone dry weight of the finished cloth was 1–2% less than the weight at atmospheric conditions. This is a normal moisture pick-up.

Style 182 with 150s yarn glass cloth was leached with 15.2% hydrochloric acid for 2.5 hours at 90° C. (194° F.). The sodium carbonate soluble silica was 97.50%. The sodium carbonate soluble silica of the style 182 with 150s yarn glass cloth prior to leaching with the acid was 6.75%.

When the same style 182 with 150s yarn glass fabric was leached for 24 hours at 82° C. (180° F.) with 9% hydrochloric acid, the sodium carbonate soluble silica was 98.85%. Utilizing 13.0% hydrochloric acid for four hours at 72° C. (162° F.), the sodium carbonate soluble silica was 98.5%. Under the same conditions employing 37% hydrochloric acid, the sodium carbonate soluble silica was only 95.20% and utilizing 2.0% hydrochloric acid for four hours at 72° C., the sodium carbonate soluble silica was only 31.80%.

Utilizing an initial digestion at 90° C. for 2.5 hours with 15% hydrochloric acid and style 182 with 150s yarn glass cloth, the following results were obtained after subsequent heat treatment at temperatures of between 1800° F. and 2200° F.

| Sample | Subsequent Heat Treatment, ° F. | Time of Heat Treatment, min. | Percent Total Silica in Final Product |
| --- | --- | --- | --- |
| 1 | None | None | 84.0 |
| 2 | 1,800 | 1 | 96.2 |
| 3 | 1,800 | 2 | 96.4 |
| 4 | 1,800 | 4 | 96.0 |
| 5 | 1,800 | 8 | 95.6 |
| 6 | 1,800 | 16 | 96.8 |
| 7 | 2,000 | 4 | 96.2 |
| 8 | 2,200 | 4 | 96.6 |

Utilizing a single roll of style 182 with 150s yarn to determine possible variations from end to end, the final product after the heat treatment at 1800° F. had a 96.3% total $SiO_2$ at the start of the roll and 96.5% at the end of the roll.

When utilizing shrink temperatures below 1500° F., laminates made from this material and a thermosetting phenolic resin tend to delaminate very badly on being subjected to high temperatures.

Test laminates were prepared according to the invention and tested in the high velocity flame of an oxy-acetylene torch. The temperature of the flame was about 5300° F. and the velocity was sufficiently high to blow away any loose material formed as a result of the high temperature. This test was an approximation of conditions in which the material would actually be used commercially. The laminates were made 4" x 4" x ⅛". Since gas temperature and velocity were constant and the impregnating resin was identical, the only difference in burnthrough time would be primarily attributable to the differences in the cloth treatment. The impregnating resin was a one-stage phenol-formaldehyde resin.

Utilizing style 182 with 150s yarn glass cloth which had been leached with 15% hydrochloric acid at 90° C. for 2.5 hours and which had been heat shrunk for eight minutes at 1800° F., the burnthrough time for four samples with the oxy-acetylene torch ranged from a low of 10.7 to a high of 12.1. None of the samples delaminated or warped badly. When the heat treatment at 1800° F. was reduced to two minutes, and the oxy-acetylene torch was applied, there was no significant change in burnthrough time (a low of 10.3 and a high of 12.0 for four samples), but all the sample delaminated or warped badly. It is critical, therefore, that the heat treatment of 1800° F. be sufficient to make a substantially completely shrunk, i.e. dimensionally stable, cloth.

What is claimed is:
1. A process of preparing glass fabric having improved resistance to high temperatures comprising etching the glass fabric with hydrochloric acid at elevated temperature until the sodium carbonate soluble silica is 95 to 99%, and then heat shrinking the etched glass fabric at a temperature of 1700 to 2350° F. until the fabric is substantially dimensionally stable and the total silica is 95 to 99%.

2. A process according to claim 1 wherein the acid etching is carried out at a temperature of 180 to 230° F. and the glass cloth is made of fibers of about 0.00038 inch diameter.

3. A process according to claim 2 wherein a finishing agent is applied to the fabric subsequent to the heat shrinking.

4. A process of preparing glass fabric having improved physical properties comprising placing glass fabric having a coating of lubricating size in hydrochloric acid having a concentration of 5 to 30% and a temperature of at least 150° F. and etching the glass fabric until it has a sodium carbonate silica content of 95 to 99%, washing the etched fabric until it is substantially free of acid, drying the washed fabric, heating the fabric at a temperature of 1700 to 2350° F. until it is dimensionally stable and has a total silica of 95 to 99%, and applying a finishing agent, the fabric being maintained with a minimum amount of handling during the period from the removal of the lubricating size in the etching bath until the application of the finishing agent.

5. A process according to claim 4 wherein the acid etching is at a temperature between 190° F. and just below the boiling point of the solution.

6. A process according to claim 4 wherein after application of the finishing agent a slipsheet selected from the group consisting of polyethylene and polypropylene is inserted between adjacent layers of glass fabric to prevent abrasion.

7. A process according to claim 1 wherein the glass fabric is a borosilicate glass.

8. Dimensionally stable, heat shrunk glass fabric prepared according to the process of claim 1.

9. Heat shrunk glass fabric according to claim 8 having a coating of a finishing agent.

10. A process of preparing glass fabric having improved resistance to high temperatures comprising etching the glass fabric with hydrochloric acid at elevated temperature until the sodium carbonate soluble silica is about 96% and then heat shrinking the etched glass fabric at a temperature of 1800 to 2000° F. until the fabric is substantially dimensionally stable and the total silica is from 96 to 99%.

11. Dimensionally stable, heat shrunk glass fabric prepared according to claim 10.

References Cited in the file of this patent

UNITED STATES PATENTS

| | | |
|---|---|---|
| 2,261,148 | Ebaugh | Nov. 4, 1941 |
| 2,334,754 | Dreyfus | Nov. 23, 1943 |
| 2,381,061 | Kallmann | Aug. 7, 1945 |
| 2,461,841 | Nordberg | Feb. 15, 1949 |
| 2,491,761 | Parker et al. | Dec. 20, 1949 |
| 2,685,120 | Brant | Aug. 3, 1954 |
| 2,686,954 | Parker | Aug. 24, 1954 |
| 2,828,528 | Gajjar | Apr. 1, 1958 |
| 2,857,653 | Ephland | Oct. 28, 1958 |
| 2,889,611 | Bedell | June 9, 1959 |